(12) United States Patent
Sriram et al.

(10) Patent No.: US 10,547,446 B2
(45) Date of Patent: Jan. 28, 2020

(54) METHOD AND APPARATUS FOR PROVIDING A UNIVERSAL DETERMINISTICALLY REPRODUCIBLE CRYPTOGRAPHIC KEY-PAIR REPRESENTATION FOR ALL SKUS, SHIPPING CARTONS, AND ITEMS

(71) Applicant: SKUChain, Inc., Mountain View, CA (US)

(72) Inventors: Srinivasan Sriram, Mountain View, CA (US); Zaki N. Manian, Los Altos Hills, CA (US)

(73) Assignee: SKUChain, Inc., Mountain View, CA (US)

( * ) Notice: Subject to any disclaimer, the term of this patent is extended or adjusted under 35 U.S.C. 154(b) by 295 days.

(21) Appl. No.: 15/583,440

(22) Filed: May 1, 2017

(65) Prior Publication Data

US 2017/0237553 A1 Aug. 17, 2017

Related U.S. Application Data

(63) Continuation of application No. 14/656,445, filed on Mar. 12, 2015, now Pat. No. 9,641,338.

(51) Int. Cl.
*H04L 9/08* (2006.01)
*H04L 9/32* (2006.01)
(Continued)

(52) U.S. Cl.
CPC ........ *H04L 9/088* (2013.01); *G06K 19/06037* (2013.01); *G06Q 10/0833* (2013.01);
(Continued)

(58) Field of Classification Search
None
See application file for complete search history.

(56) References Cited

U.S. PATENT DOCUMENTS 5,478,990 A 12/1995 Montanari et al.
5,892,900 A 4/1999 Ginter
(Continued)

FOREIGN PATENT DOCUMENTS

JP 2001236435 A 8/2001
JP 2002092375 A 3/2002
(Continued)

OTHER PUBLICATIONS

T. Pornin, Deterministic Usage of the Digital Signature Algorithm (DSA) and Elliptic Curve Digital Signature Algorithm (ECDSA), Aug. 2013, RFC 6979, ISSN: 2070-1721, pp. 1-20 (Year: 2013).*
(Continued)

*Primary Examiner* — Kambiz Zand
*Assistant Examiner* — Arezoo Sherkat
(74) *Attorney, Agent, or Firm* — Perkins Coie LLP

(57) ABSTRACT

A cryptographic representation of value is adapted to goods in production and products at various stages through a supply chain as represented by their stock keeping units or SKU's that refer to a unique identifier or code for the particular stock keeping unit. Embodiments of the invention disclose the generation of a universal unique, yet deterministic, key-pair for all SKUs, shipping cartons, and items, i.e. for every single SKU, shipping carton and item on the globe.

6 Claims, 7 Drawing Sheets

(51) Int. Cl.
  *H04L 9/30* (2006.01)
  *G06Q 10/08* (2012.01)
  *G06K 19/06* (2006.01)
  *H04L 9/06* (2006.01)
(52) U.S. Cl.
  CPC .............. *H04L 9/06* (2013.01); *H04L 9/0869* (2013.01); *H04L 9/30* (2013.01); *H04L 9/3066* (2013.01); *H04L 9/3242* (2013.01); *G06Q 2220/00* (2013.01)

(56) References Cited

U.S. PATENT DOCUMENTS

| | | | |
|---|---|---|---|
| 6,044,462 | A | 3/2000 | Zubeldia et al. |
| 6,192,370 | B1 | 2/2001 | Primsch |
| 6,829,333 | B1 | 12/2004 | Frazier |
| 7,181,017 | B1 | 2/2007 | Nagel et al. |
| 7,222,791 | B2 | 5/2007 | Heilper et al. |
| 7,545,930 | B1 | 6/2009 | Shields et al. |
| 8,447,987 | B1 | 5/2013 | Polonsky et al. |
| 8,677,133 | B1 | 3/2014 | Spencer |
| 8,781,882 | B1 | 7/2014 | Arboletti et al. |
| 2001/0032310 | A1 | 10/2001 | Corella |
| 2001/0042050 | A1 | 11/2001 | Fletcher et al. |
| 2005/0050122 | A1 | 3/2005 | Blumenthal et al. |
| 2005/0075900 | A1 | 4/2005 | Arguimbau |
| 2005/0098696 | A1 | 5/2005 | Lowe |
| 2005/0254658 | A1 | 11/2005 | Brown et al. |
| 2006/0059333 | A1 | 3/2006 | Gentry et al. |
| 2006/0100920 | A1 | 5/2006 | Pretorius et al. |
| 2007/0074036 | A1 | 3/2007 | Ramzan et al. |
| 2007/0156281 | A1 | 7/2007 | Leung et al. |
| 2008/0010239 | A1 | 1/2008 | Nochta et al. |
| 2008/0016167 | A1 | 1/2008 | Lund et al. |
| 2009/0141891 | A1 | 6/2009 | Boyen et al. |
| 2009/0187482 | A1 | 7/2009 | Blount et al. |
| 2009/0198596 | A1 | 8/2009 | Dolan et al. |
| 2010/0111296 | A1* | 5/2010 | Brown ................. H04L 9/0643 380/28 |
| 2011/0016318 | A1 | 1/2011 | Syngkon et al. |
| 2011/0320805 | A1* | 12/2011 | Chaves ................ G06Q 10/087 713/150 |
| 2012/0210118 | A1 | 8/2012 | Chaves et al. |
| 2012/0213366 | A1† | 8/2012 | Brown et al. |
| 2013/0290358 | A1† | 10/2013 | Dogaru et al. |
| 2014/0129288 | A1 | 5/2014 | Eager et al. |
| 2014/0136218 | A1 | 5/2014 | Bolene et al. |
| 2014/0229384 | A1 | 8/2014 | St. Johns et al. |
| 2015/0100475 | A1 | 4/2015 | Cummings et al. |
| 2015/0227890 | A1 | 8/2015 | Bednarek et al. |
| 2015/0269570 | A1* | 9/2015 | Phan .................. G06Q 20/3276 705/71 |
| 2016/0012424 | A1 | 1/2016 | Simon et al. |
| 2016/0098723 | A1* | 4/2016 | Feeney .............. G06Q 20/4016 705/75 |
| 2016/0098726 | A1 | 4/2016 | Karaki |
| 2016/0098730 | A1* | 4/2016 | Feeney .............. G06Q 30/0185 705/71 |
| 2016/0162897 | A1* | 6/2016 | Feeney .............. G06Q 20/4014 705/71 |
| 2016/0180274 | A1* | 6/2016 | Zwakhals ........ G06Q 10/06315 705/7.25 |

FOREIGN PATENT DOCUMENTS

| | | |
|---|---|---|
| JP | 2004307095 A | 11/2004 |
| JP | 2008535109 A | 8/2008 |
| JP | 2012530974 A | 12/2012 |
| WO | 02078238 A2 | 10/2002 |
| WO | 2005098696 A1 | 10/2005 |
| WO | 2014095737 A1 | 6/2014 |

OTHER PUBLICATIONS

Nakamoto, Satoshi, "Bitcoin: A Peer-to-Peer Electronic Cash System", Retrieved from the Internet: URL:http://nakamotoinstitute.org/static/docs/bitcoin.pdf, [Retrieved on Jul. 4, 2017], Oct. 31, 2008, pp. 1-9.

Skudnov, Rostislav, "Bachelor's Thesis (UAS) Degree Program in Information Technology", Retrieved from the Internet: URL:http://publications.theseus.fi/bitstream/handle/10024/47166/Skudnov_Rostislav.pdf?sequence=1, [Retrieved on Jul. 24, 2014], Jan. 1, 2012, 38 pages.

Urushima, Kenji, "Bitcoin Study Session (Technical Edition) Session 1", Retrieved from the Internet: URL:https//www.slideshare.net/kenjiurushima/20140602-bitcoin1201406031222, [Retrieved on Jul. 3, 2018], Jun. 2, 2014, pp. 1-119.

Anonymous: "International Article Number—Wikipedia", Mar. 6, 2015, XP055525338. Retrieved Nov. 20, 2018 from the internet: https://en.wikipedia.org/w/index.php?title=International_Article_Number&oldid=708605195; 9 pages.

American National Standard for Financial Services: X9.42-2003, Public Key Cryptography for the Financial Services Industry, Agreement of Symmetric Keys Using Discrete Logarithm Cryptography, American National Standards Institute, Accredited Standards Committee on Financial Services, X9, ASC X9, Incorporated, Nov. 19, 2003, pp. 1-118.

Back, A. et al., "Enabling Blockchain Innovations with Pegged Sidechains", [online], Retrieved from: <http://www.opensciencereview.com/papers/123/enablingblockchain-innovations-with-pegged-sidechains>, 2014, pp. 1-25.

Microprocessor and MS Committee, "IEEE Standard Specifications for Public-Key Cryptography," IEEE Computer Society, Aug. 29, 2000, pp. 1-226.

Gonzalez, A., Bitcoin: A New Supply Chain Operating System? [online], 2015, https://talinglogistics.com/2015/01/26/bitcoin-new-supply-chain-operating-system/ (well-known technology shown).

Lewenberg, Y., "Inclusive Block Chain Protocols," [online] 2015 https://fc15.ifca.ai/preproceedings/paper_101.pdf.

\* cited by examiner
† cited by third party

METHOD AND APPARATUS FOR PROVIDING A UNIVERSAL DETERMINISTICALLY REPRODUCIBLE CRYPTOGRAPHIC KEY-PAIR REPRESENTATION FOR ALL SKUS, SHIPPING CARTONS, AND ITEMS

CROSS-REFERENCE TO RELATED APPLICATION(S)

This application is a continuation of U.S. patent application Ser. No. 14/656,445, entitled "METHOD AND APPARATUS FOR PROVIDING A UNIVERSAL DETERMINISTICALLY REPRODUCIBLE CRYPTOGRAPHIC KEY-PAIR REPRESENTATION FOR ALL SKUs, SHIPPING CARTONS, AND ITEMS," filed Mar. 12, 2015, all of which is incorporated by reference herein in its entirety.

FIELD

Various of the disclosed embodiments concern providing a universal, deterministically reproducible, cryptographic key-pair representation for all SKUs, shipping cartons, and items.

BACKGROUND

Public-Key Cryptography

Public-key cryptography, also known as asymmetric cryptography, is a class of cryptographic algorithms which requires two separate keys, one of which is secret (or private) and one of which is public. Although different, the two parts of this key pair are mathematically linked. The public key is used to encrypt plaintext or to verify a digital signature; whereas the private key is used to decrypt ciphertext or to create a digital signature. The term "asymmetric" stems from the use of different keys to perform these opposite functions, each the inverse of the other—as contrasted with conventional ("symmetric") cryptography which relies on the same key to perform both.

Public-key algorithms are based on mathematical problems which currently admit no efficient solution that are inherent in certain integer factorization, discrete logarithm, and elliptic curve relationships. It is computationally easy for a user to generate their own public and private key-pair and to use them for encryption and decryption. The strength lies in the fact that it is "impossible" (computationally infeasible) for a properly generated private key to be determined from its corresponding public key. Thus the public key may be published without compromising security, whereas the private key must not be revealed to anyone not authorized to read messages or perform digital signatures. Public key algorithms, unlike symmetric key algorithms, do not require a secure initial exchange of one (or more) secret keys between the parties.

Message authentication involves processing a message with a private key to produce a digital signature. Thereafter anyone can verify this signature by processing the signature value with the signer's corresponding public key and comparing that result with the message. Success confirms the message is unmodified since it was signed, and—presuming the signer's private key has remained secret to the signer—that the signer, and no one else, intentionally performed the signature operation. In practice, typically only a hash or digest of the message, and not the message itself, is encrypted as the signature.

Public-key algorithms are fundamental security ingredients in cryptosystems, applications and protocols. They underpin various Internet standards, such as Transport Layer Security (TLS), PGP, and GPG. Some public key algorithms provide key distribution and secrecy, e.g. Diffie-Hellman key exchange, some provide digital signatures, e.g. Digital Signature Algorithm, and some provide both, e.g. RSA.

Public-key cryptography finds application in, amongst others, the IT security discipline information security. Information security (IS) is concerned with all aspects of protecting electronic information assets against security threats. Public-key cryptography is used as a method of assuring the confidentiality, authenticity and non-repudiability of electronic communications and data storage.

Bitcoin

In bitcoin, ownership of a bitcoin is established through digital keys, bitcoin addresses, and digital signatures. The digital keys are not actually stored in the network, but are instead created and stored by users in a file, or simple database, called a wallet. The digital keys in a user's wallet are completely independent of the bitcoin protocol and can be generated and managed by the user's wallet software without reference to the blockchain or access to the Internet. Keys enable many of the interesting properties of bitcoin, including de-centralized trust and control, ownership attestation, and the cryptographic-proof security model.

Every bitcoin transaction requires a valid signature to be included in the blockchain, which can only be generated with valid digital keys; therefore, anyone with a copy of those keys has control of the bitcoin in that account. Keys come in pairs consisting of a private (secret) key and a public key. The public key is similar to a bank account number and the private key is similar to the secret PIN, or signature on a check that provides control over the account. These digital keys are very rarely seen by the users of bitcoin. For the most part, they are stored inside the wallet file and managed by the bitcoin wallet software.

In the payment portion of a bitcoin transaction, the recipient's public key is represented by its digital fingerprint, called a bitcoin address, which is used in the same way as the beneficiary name on a check, i.e. "Pay to the order of." In most cases, a bitcoin address is generated from, and corresponds to, a public key. However, not all bitcoin addresses represent public keys; they can also represent other beneficiaries such as scripts. This way, bitcoin addresses abstract the recipient of funds, making transaction destinations flexible, similar to paper checks: a single payment instrument that can be used to pay into people's accounts, pay into company accounts, pay for bills, or pay to cash. The bitcoin address is the only representation of the keys that users routinely see, because this is the part they need to share with the world.

It is problematic to associate a unique cryptographic address with each and every item in a large group of associated items in a scalable manner. This is particularly true because keys are typically generated randomly in a cryptographic system, such as bitcoin, while associated items are often thought of sequentially, e.g. as with serial numbers. It would be advantageous if the non-repudiability aspect of public-key cryptography, for example as applied in bitcoin, could applied to maintaining a trusted audit trail for sequential items, such as SKUs, shipping cartons, and other items, for example to assure the provenance of, and lack of tampering with, associated items at all levels and at various forms of consolidation or distribution within a supply chain.

SUMMARY

A cryptographic representation of value is adapted to goods in production and products at various stages through a supply chain as represented by their stock keeping units or SKU's that refer to a unique identifier or code for the particular stock keeping unit. Embodiments of the invention disclose the generation of a universal unique, yet deterministic, key-pair for all SKUs, shipping cartons, and items, i.e. for every single SKU, shipping carton and item on the globe.

DRAWINGS

DETAILED DESCRIPTION

Figure 1:
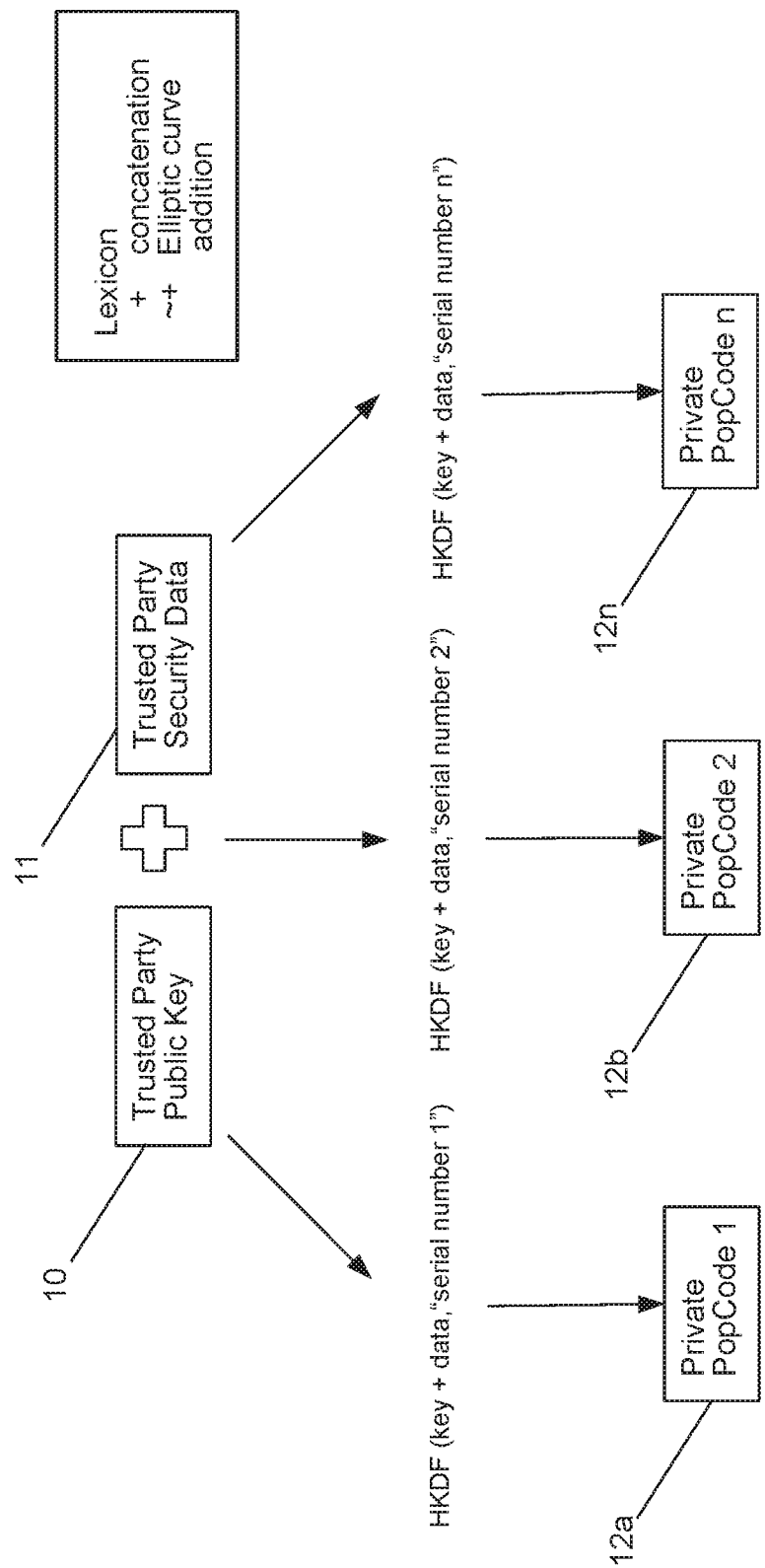
FIG. 1 is a flow diagram showing deterministic key generation to derive private popcodes according to the invention.

A Universal, Deterministically Reproducible, Cryptographic Key-Pair Representation for all SKUs, Shipping Cartons, and Items Various embodiments are directed at using one or more cryptographic methods of key-pair representation for items throughout a supply network. This disclosure relates to U.S. patent application Ser. No. 14/562,303, filed on Dec. 5, 2014 and Ser. No. 14/632,99, filed on Feb. 26, 2015, each of which is incorporated herein in its entirety by this reference thereto.

Various embodiments of the invention are directed at the use of one or more cryptographic methods in connection with provenance tracking and serialization. Provenance refers to an authentic identity of the origin of a quantity of goods. Provenance tracking can be enabled by a computer system, e.g. one or more computer servers or other computing devices, hereinafter referred to as a provenance management system. The provenance management system can maintain one or more profiles of one or more participant entities that participate in its logistic platform. Each profile can include at least a public identity key, e.g. a public key for asymmetric cryptography, corresponding to a participant entity. The public identity key is used to verify any cryptographic signature made by the participant entity.

When a first company manufactures a first quantity of goods, a first computing device controlled by the first company can report the ownership of the first quantity of goods via a logistic transaction record to a public ledger database. The public ledger database can store logistic transaction records in a distributed manner. The first computing device can report the logistic transaction record to the public ledger database via the provenance management system. The first computing device can cryptographically sign this logistic transaction with its private cryptographic key.

When the first company prepares to deliver the first quantity of goods to its various customers, the first computing device can request a proof of provenance code (hereinafter a "popcode") label from the provenance management system or an agent thereof. The popcode label encodes a private popcode key used to cryptographically sign a logistic transaction record. The provenance management system can store a public popcode key corresponding to the private popcode key in its trusted storage, such that it can verify the signature made by the private popcode key, e.g. hence establishing a proof-of-possession.

In some embodiments of the invention, the provenance management system can store the popcode key pair in its trusted storage. For example, a popcode label can be a 32 bit barcode, such as a two-dimensional barcode. In some embodiments, the first computing device can request a batch of popcode labels to label its goods. The first computing device can report a logistic transaction record that assigns a second quantity of goods to a popcode address onto the public ledger database. The second quantity of goods can overlap at least partially with the first quantity of goods.

The provenance management system can maintain the public ledger database by interfacing with a distributed consensus system comprising multiple delegation nodes, e.g. computing devices. For example, the public ledger database can be maintained in a distributed manner as a block chain. The block chain keeps track of all confirmed logistic transactions that occur within the logistics platform maintained by the provenance management system. A logistic transaction is an inventory record of quantified goods that occurs within a company or between companies. A logistic transaction can define a quantity of one or more items associated with one or more types of items. The logistic transaction can define a source of the items, such as by referencing one or more previous logistic transactions that source at least a subset of the quantity of items described in the current logistic transaction. The logistic transaction can define a destination address, e.g. an identity address or a popcode address, of where the items are assigned to.

In several embodiments of the invention, the block chain confirms to the logistic transactions via the distributed consensus system. The distributed consensus system confirms waiting logistic transactions by including them in the block chain. The distributed consensus system enforces a chronological order in the block chain and hence protects the neutrality of a network of computing devices that implements the public ledger database.

The invention herein described relies upon the block chain keeping track of multiple logistic transactions. Any consumer or company can access the block chain to verify the provenance associated with a set of items by access the block chain. For example, any popcode label consistent with the logistics platform can be scanned to check against the public ledger database represented by the block chain.

Embodiments of the invention adapt a cryptographic representation of value to goods in production and products at various stages through the supply chain as represented by their stock keeping units or SKU's. In the field of inventory management, a stock keeping unit or SKU is a distinct item for sale, such as a product or service, and all attributes associated with the item that distinguish it from other items. For a product, these attributes include, but are not limited to, manufacturer, product description, material, size, color, packaging, and warranty terms. When a business takes an inventory, it counts the quantity of each SKU.

SKU can also refer to a unique identifier or code that refers to the particular stock keeping unit. These codes are not regulated nor standardized. Thus, in embodiments of the invention, when one company receives items from another vendor, it has a choice of maintaining the vendor's SKU or creating its own. Other entity tracking methods, with varying regulations, are Universal Product Code (UPC), International Article Number (EAN), Global Trade Item Number (GTIN), and Australian Product Number (APN). Embodiments of the invention disclose the generation of a universal unique, yet deterministic, key-pair for all SKUs, shipping cartons, and items, i.e. for every single SKU, shipping carton and item on the globe.

Definitions

For purposes of the disclosure herein, the following terms will have their associated meanings.
Elliptic Curve Cryptography:

Uses arithmetic on coordinates that satisfy the elliptic curve equation on $y^2=x^3+ax+b$ on a subset of the integers to construct a trap door function suitable for cryptography. In embodiments of the invention, the subset of integers should be at least all 32-byte integers to maintain the minimum security guarantees of the herein disclosed system. Examples of an appropriate curve include secp256k (see Certicom Research, http://perso.univ-rennes1.fr/sylvain-.duquesne/master/standards/sec2_final.pdf) used by Bitcoin and ed25519 (see Daniel J. Bernstein, Niels Duif, Tanja Lange, Peter Schwabe, BoYin Yang, High-speed high-security signatures, Journal of Cryptographic Engineering 2 (2012), 77-89).
Private Key:

A private key is coordinate on the elliptic curve. An example of such a private key is:
    QX1R9sgBKgvbhEvxvibUqE8fGVQMzL7n8dgz
        ACuufuP3ptUxDJmS.
Public Key:

A public key is a coordinate generated by multiplying a private key curve coordinate with the point G in the curve definition. An example of such a public key is:
    DDAaRzdpz6pTz5qmvR7eQhWyzsWiKB1qgF.
What are Deterministic Addresses?

Elliptic curve mathematics permit schemes where one can calculate the public keys without revealing the private keys. In embodiments of the invention, this permits, for example, the generation of fresh addresses for each and every item and shipping carton on the globe. These addresses can be represented as bar-codes, QR-codes, or written into RFID tags of different types, i.e. UHF, NFC, etc.

In Bitcoin BIP325 (see https://github.com/bitcoin/bips/blob/master/bip-0032.mediawiki), the Bitcoin reference client uses randomly generated keys. To avoid the necessity for a backup after every transaction, (by default) 100 keys are cached in a pool of reserve keys. Still, these wallets are not intended to be shared and used on several systems simultaneously. They support hiding their private keys by using the wallet encrypt feature and not sharing the password, but such neutered wallets lose the power to generate public keys as well.

Deterministic wallets do not require such frequent backups, and elliptic curve mathematics permit schemes where one can calculate the public keys without revealing the private keys. This permits for example a webshop business to let its webserver generate fresh addresses (public key hashes) for each order or for each customer, without giving the webserver access to the corresponding private keys (which are required for spending the received funds).

However, deterministic wallets typically consist of a single chain of keypairs. The fact that there is only one chain means that sharing a wallet happens on an all-or-nothing basis. However, in some cases one only wants some (public) keys to be shared and recoverable. In the example of a webshop, the webserver does not need access to all public keys of the merchant's wallet; only to those addresses which are used to receive customer's payments, and not for example the change addresses that are generated when the merchant spends money. Hierarchical deterministic wallets allow such selective sharing by supporting multiple keypair chains, derived from a single root.

In embodiments of the invention, with regard to deterministic key generation, the derivation can use one chain or, in a hierarchical deterministic mechanism, can allow for multiple chains, each derived from a single root.

In cryptography, a key derivation function (or KDF) derives one or more secret keys from a secret value, such as a master key or other known information, such as a password or passphrase using a pseudo-random function. Key derivation functions are often used in conjunction with non-secret parameters to derive one or more keys from a common secret value, which is sometimes also referred to as key diversification. Such use may prevent an attacker who obtains a derived key from learning useful information about either the input secret value or any of the other derived keys. A KDF may also be used to ensure that derived keys have other desirable properties, such as avoiding weak keys in some specific encryption systems.

The most common use of KDFs is the password hashing approach to password verification, as used by the passwd file or shadow password file. The non-secret parameters are called salt in this context.

Key derivation functions are often used as components of multiparty key-agreement protocols. Examples of such key derivation functions include KDF1, defined in IEEE Std 1363-2000, and similar functions in ANSI X9.42. Key derivation functions are also used to derive keys from secret passwords or passphrases. The HMAC-based Extract-and-Expand Key Derivation Function (HKDF) specified in RFC 5869 is a simple HMAC-based KDF, which can be used as a building block in various protocols and applications.

In embodiments of the invention, HKDF is used in connection with the private key and security data, e.g. a serial number, to produce a private popcode for each sequential item in a lot or collection of associated items.

Popcodes can be derived from a sequence of identifiers through two approaches. The first approach applies if physical popcodes that encode the cryptographic information are manufactured by a provider, such as skuchain. The provider generates private cryptographic information. As a result, the provider can facilitate bulk operations against a range within the sequence of identifiers. The second approach allows a customer to privately manage the private popcodes but allows the provider to conduct operations on a range of identifiers.

When popcodes are produced by the provider, the provider derives the popcodes through the following process. The provider generates a secret key value. The size of this key value is determined by the choice of hash function. HMACSHA512 would use a 512 bit key. HMAC SHA512 run on the sequential identifier and key produces a 512 bit pseudorandom value. The 256 most significant bits can be extracted in the creation of elliptic curve key pair. By convention, one treats these bits as a 32 byte integer value and solves the curve equation with 32 bytes representing the x value. Now you have Xpriv,Ypriv. (Xpriv,Ypriv*G(the generator point)=(Xpub,Ypub). 0x01||64 public bytes and hash them with Sha256 and shorten the hash to 160 bytes with RIPE160.

The 33 byte compressed private key is a private popcode that can be used to cryptographically prove possession. The 160 byte identifier is a unique non-sequential identifier that can be used to look up the provenance and tokens associated with the item.

If a customer wishes to produce popcodes where the secret popcode is not known to the provider, the provider can offer an alternative key derivation sequence. The customer securely generates a private point and a public point using the algorithm above. Take the public point(Xpub) and another 32 bytes of entropy and use this to key a HMAC (HMACSHA512) function that takes a sequential identifier and returns a pseudorandom 512 bit value. Take the most significant 256 bits and generate an intermediate curve point via solving the curve equation. Add the intermediate point to the customer private point to generate a new point that is a private popcode used to prove possession. Add the point to the customer public key and generate a new public point, where the SHA156 and RIPE160 can be used to look up the provenance of the item.

FIG. 1, which is a flow diagram showing the deterministic key generation according to the invention, shows the linking of a sequential number to a random number such that a user can perform a sequence of cryptographically secure transaction on an item-by-item basis without managing the underlying cryptography. In this case, a central, trusted authority (as discussed above) generates a series of private popcodes 12a, 12b, 12n, for each item in a lot of similar items. This is accomplished by concatenating a trusted party public key 10, security data 11, i.e. a master seed, and a serial number, for example by hashing with a key derivation function. The trusted party can apply a private key to verify any private popcode.

Figure 2:
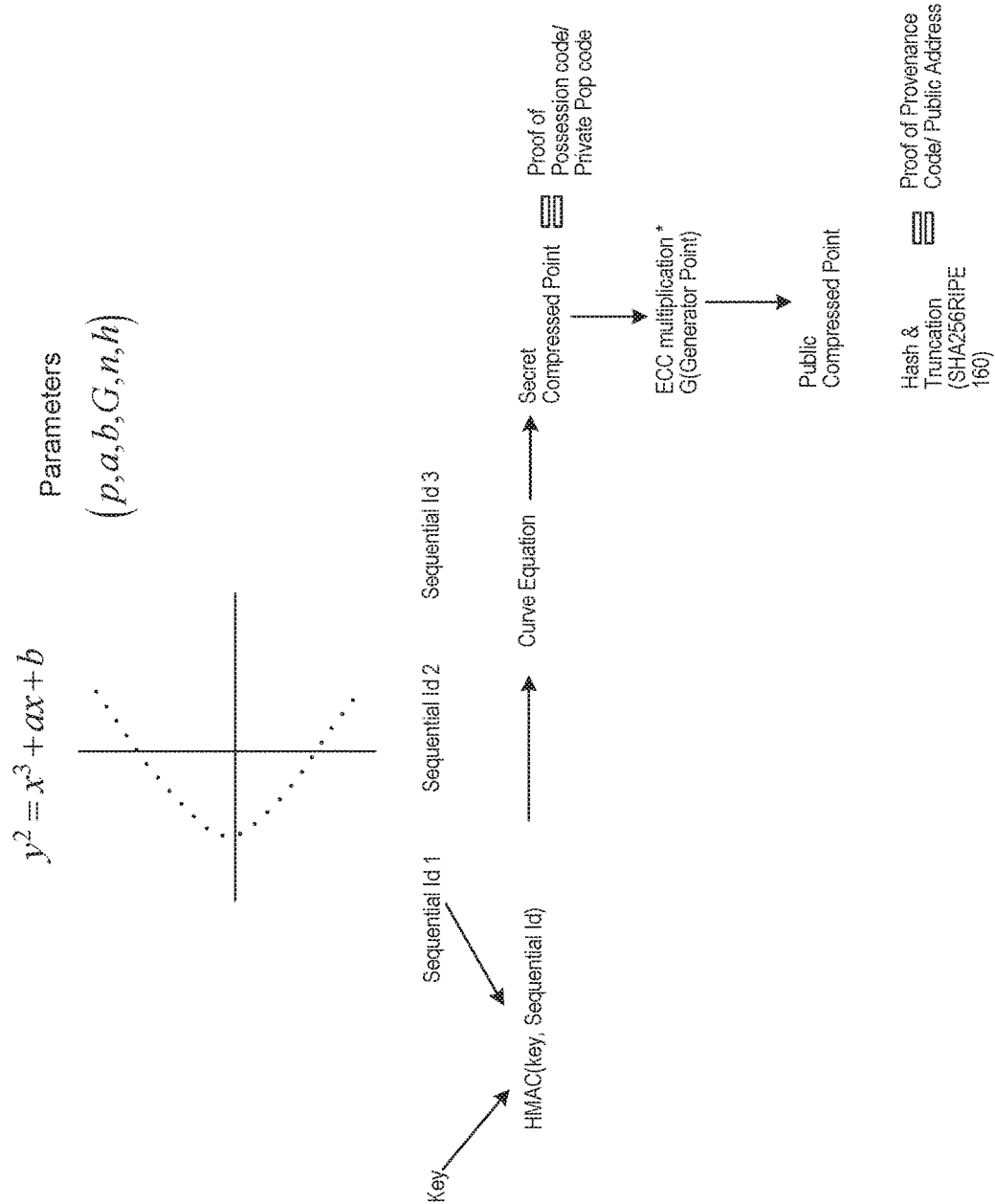
FIG. 2 is a further flow diagram showing deterministic key generation to derive private popcodes according to the invention.

FIG. 2 is a further flow diagram showing deterministic key generation to derive private popcodes according to the invention. FIG. 2 shows popcode key derivation type 1 that is used to derive private popcodes. This permits prepoduction of popcodes in printed and RFID form. In FIG. 2, the key is a trusted authority secret key. The length of the key is determined by a hash function, i.e. a cryptographic hash function such as SHA 256, SHA 512, BLAKE2, etc. HMAC combines a key, a hash, and contents to produce a deterministic collision resistant value. An elliptic curve is shown, in which the curve equation of a finite field is suitable for cryptography, where the field size is less than or equal to the hash output.

Figure 3:
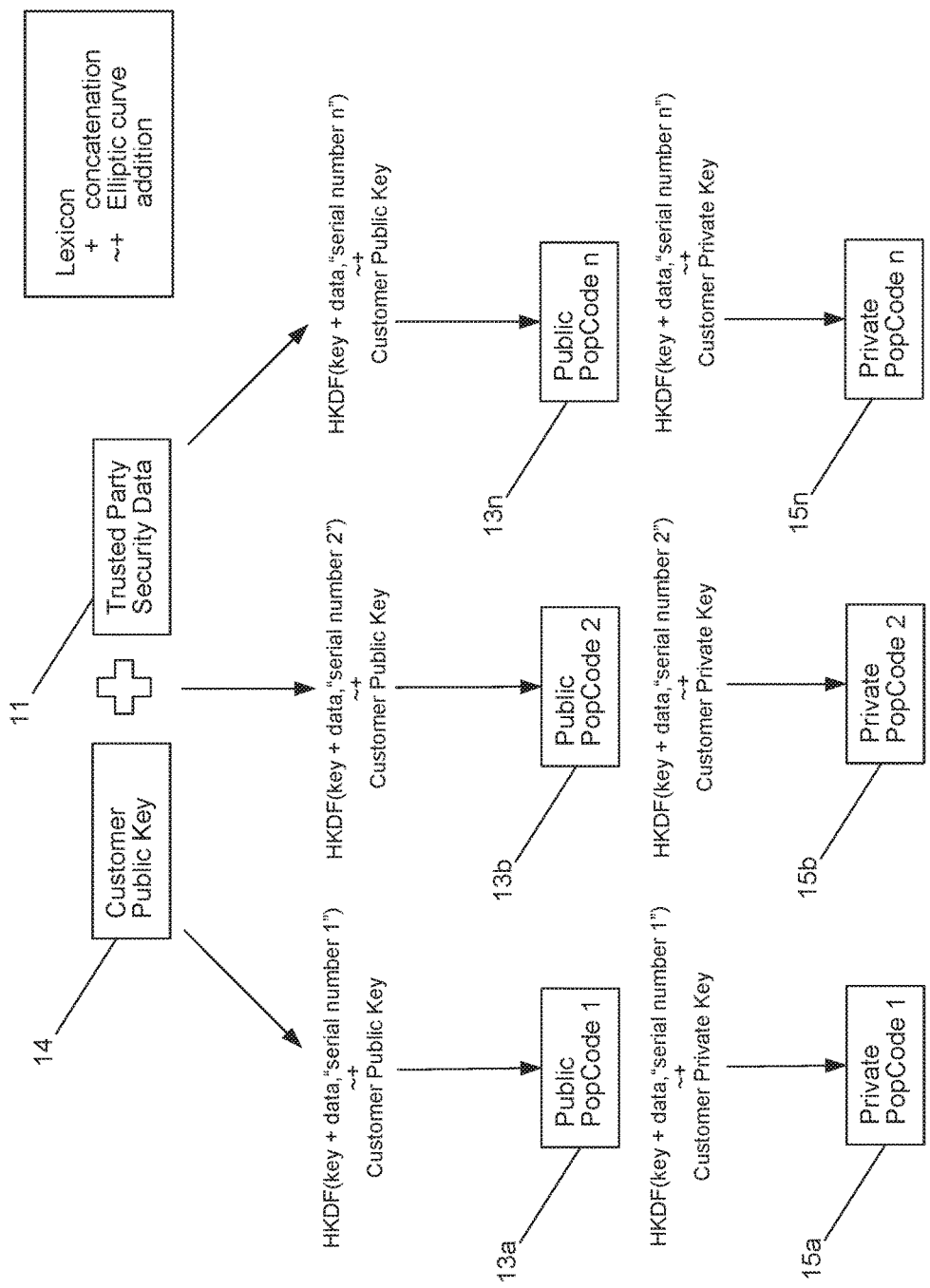
FIG. 3 is a flow diagram showing deterministic key generation to derive public popcodes according to the invention.

FIG. 3 is a flow diagram showing deterministic key generation to derive public popcodes according to the invention.

Figure 4:
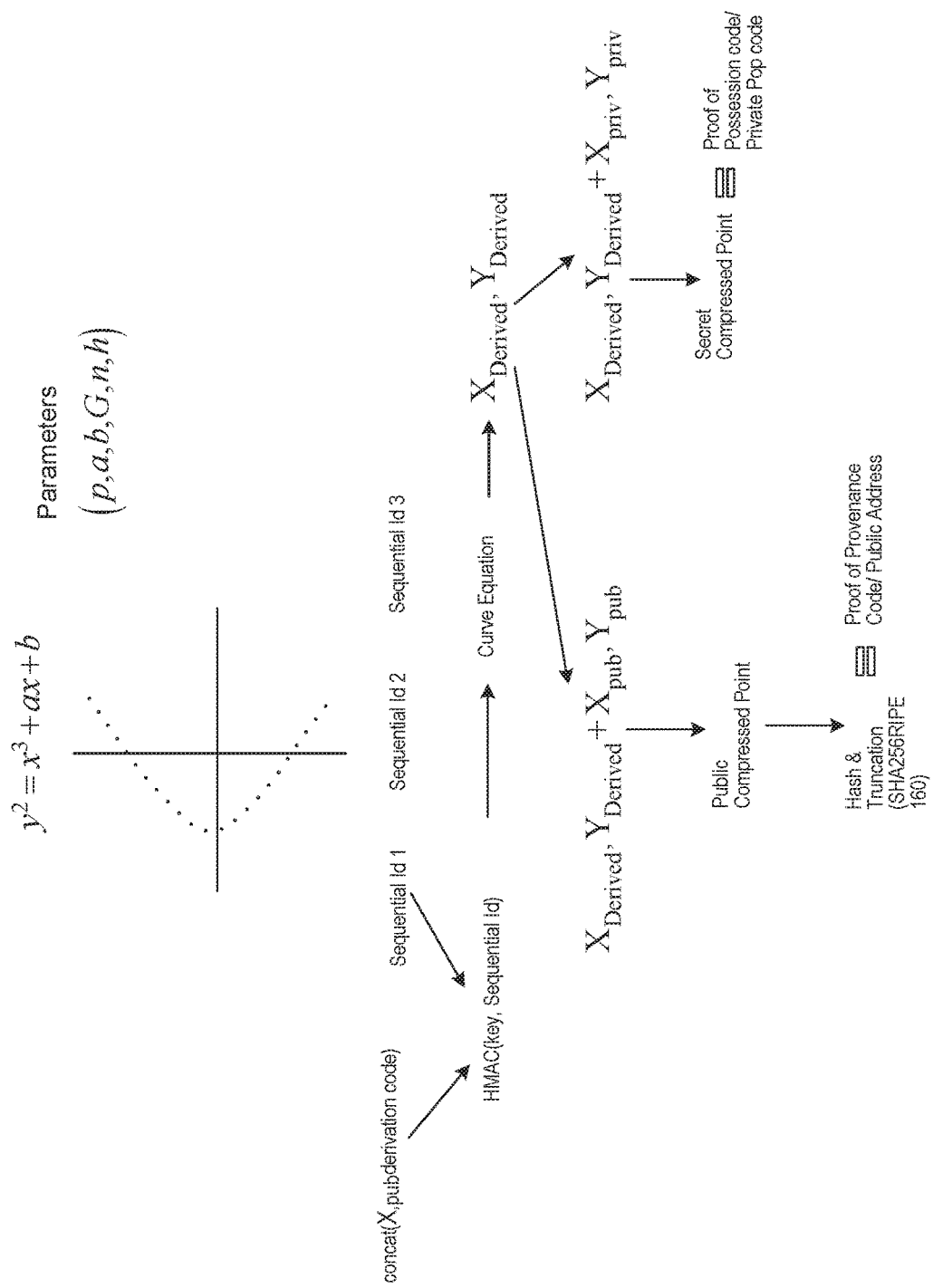
FIG. 4 is a further flow diagram showing deterministic key generation to derive public popcodes according to the invention.
Figure 5:
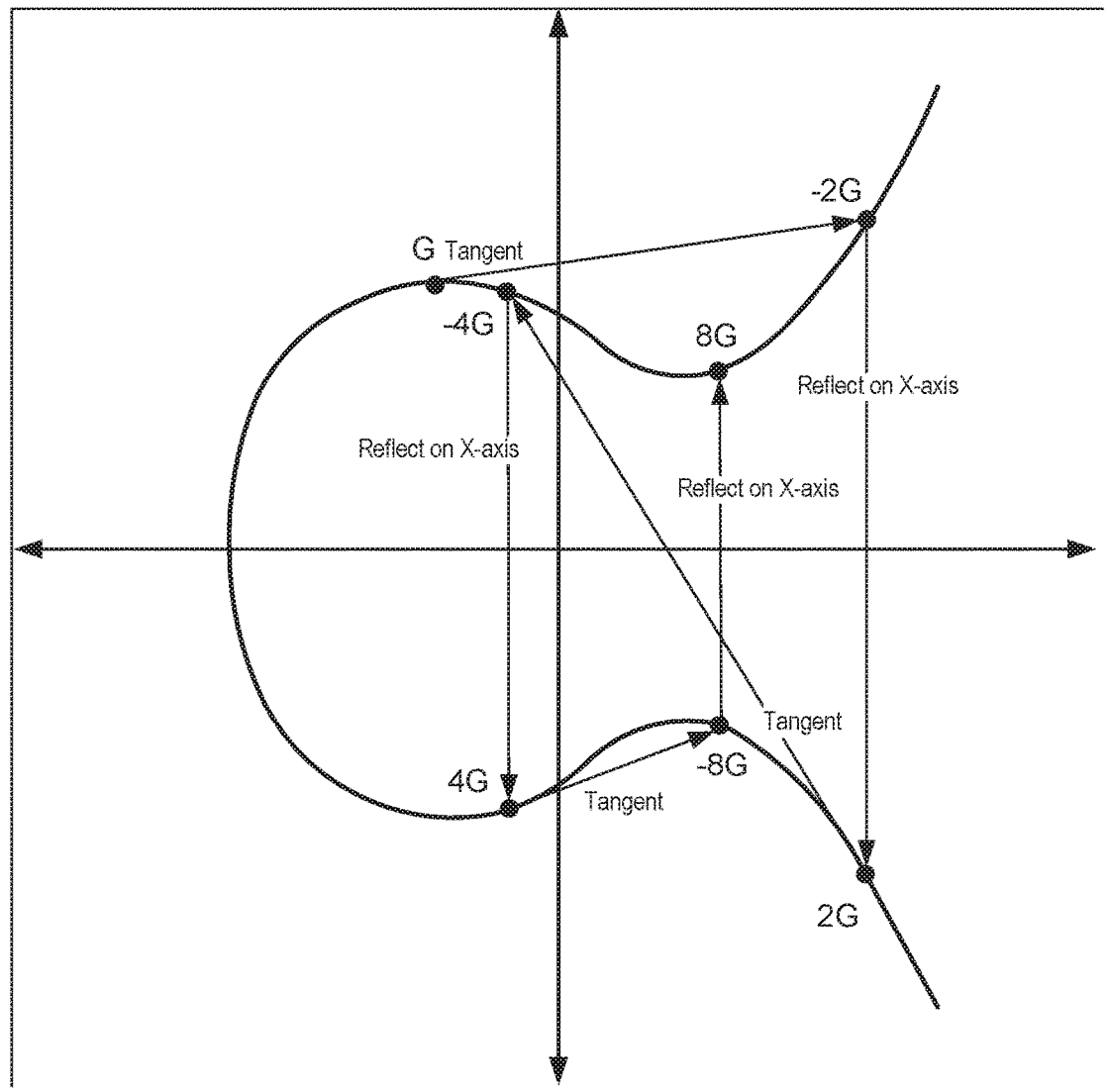
FIG. 5 is a an elliptic curve diagram that highlights the generation of a public-private key-pair according to the invention.

FIG. 4 is a further flow diagram showing deterministic key generation to derive public popcodes according to the invention. FIG. 4 shows popcode key derivation type 2 with which a provider, such as skuchain, derives only public popcodes. Production of popcodes is the responsibility of the customers. In FIG. 4, $X_{priv}, Y_{priv}$ and $X_{pub}, Y_{pub}$ and the derivation code are used by the customer to generate an elliptic curve keypair, consisting of a private point and a derived public point on the curve. The customer generates a derivation code if additional data is required by the HMAC key. The hash is a cryptographic hash function, such as SHA 256, SHA 512, BLAKE2, etc. HMAC combines a key, a hash, and contents to produce a deterministic collision resistant value. An elliptic curve is shown, in which the curve equation of a finite field is suitable for cryptography, where the field size is less than or equal to the hash output.

The following discussion provide further details on each step of the invention.

Master Key Generation

In embodiments of the invention, the total number of possible extended key-pairs is almost 2^512, but the produced keys are only 256 bits long, and offer about half of that in terms of security. Therefore, master keys are not generated directly, but instead from a potentially short seed value. In an embodiment of the invention, this proceeds as follows:

1. Generate a seed byte sequence S of a chosen length, e.g. between 128 and 512 bits (256 bits is advised) from a (P)RNG.
2. Calculate a hash-based message authentication code (HMAC) using the SHA512 hash function, e.g. I=HMACSHA512(Key="Bitcoin seed", Data=S)
3. Split I into two 32-byte sequences, IL and IR.
4. Use parse$_{256}$(IL) as master secret key, and IR as master chain code.

In case IL is 0 or ≥n, the master key is invalid.

Composition of Master Seed for Items, SKU's, and Shipping Cartons

The following differences are to be noted for how the master seed is generated for deterministic addresses used for every SKU and shipping carton on the globe:
1. One of the fields (up to 32 bytes long) comprising the master seed is a public address that identifies the manufacturer, shipper, or relevant owning authority.
2. This is followed by a sequence number that is up to 13 bytes long.
3. This is followed by a seed byte sequence S of up to 19 bytes from a (P)RNG Generation of Deterministic Addresses FIG. 4 is a an elliptic curve diagram that highlights the generation of a public-private key-pair according to the invention. Elliptic curve cryptography is a type of asymmetric or public-key cryptography based on the discrete logarithm problem as expressed by addition and multiplication on the points of an elliptic curve. For example, bitcoin uses a specific elliptic curve and set of mathematical constants, as defined in a standard called secp256k1, established by the National Institute of Standards and Technology (NIST). The secp256k1 curve is defined by the following function, which produces an elliptic curve:

$$\{y^2=(x^3+7)\}~\text{over}~(\mathbb{f}_p)$$

or $$\{y^2 \mod p=(x^3+7)\mod p\}$$

The mod p (modulo prime number p) indicates that this curve is over a finite field of prime order p, also written as
latexmath:[\(\mathbb{f}_p\)],
where p=2256−232−29−28−27−26−24−1, a very large prime number.

In embodiments of the invention, an elliptic curve is similar to that used by bitcoin. where:
Given k=private key, K=public Key, and G=a point (x, y) on the curve; and
kG=K.

In elliptic curves, adding a point to itself is the equivalent of drawing a tangent line on the point and finding where it intersects the curve again, then reflecting that point on the x-axis.

Now, given a sequential number ($n_1$) a new point $G_1$ can be derived that is at $n_1G_1$ and its associated key-pair.

Association of a Sequence of Addresses to a Group of Similar Items

It is problematic to associate a unique cryptographic address with each and every item in a group of similar items in a scalable manner. For example, how would a shipment of 1,000 boxes each be associated with a unique number?

Figure 6:
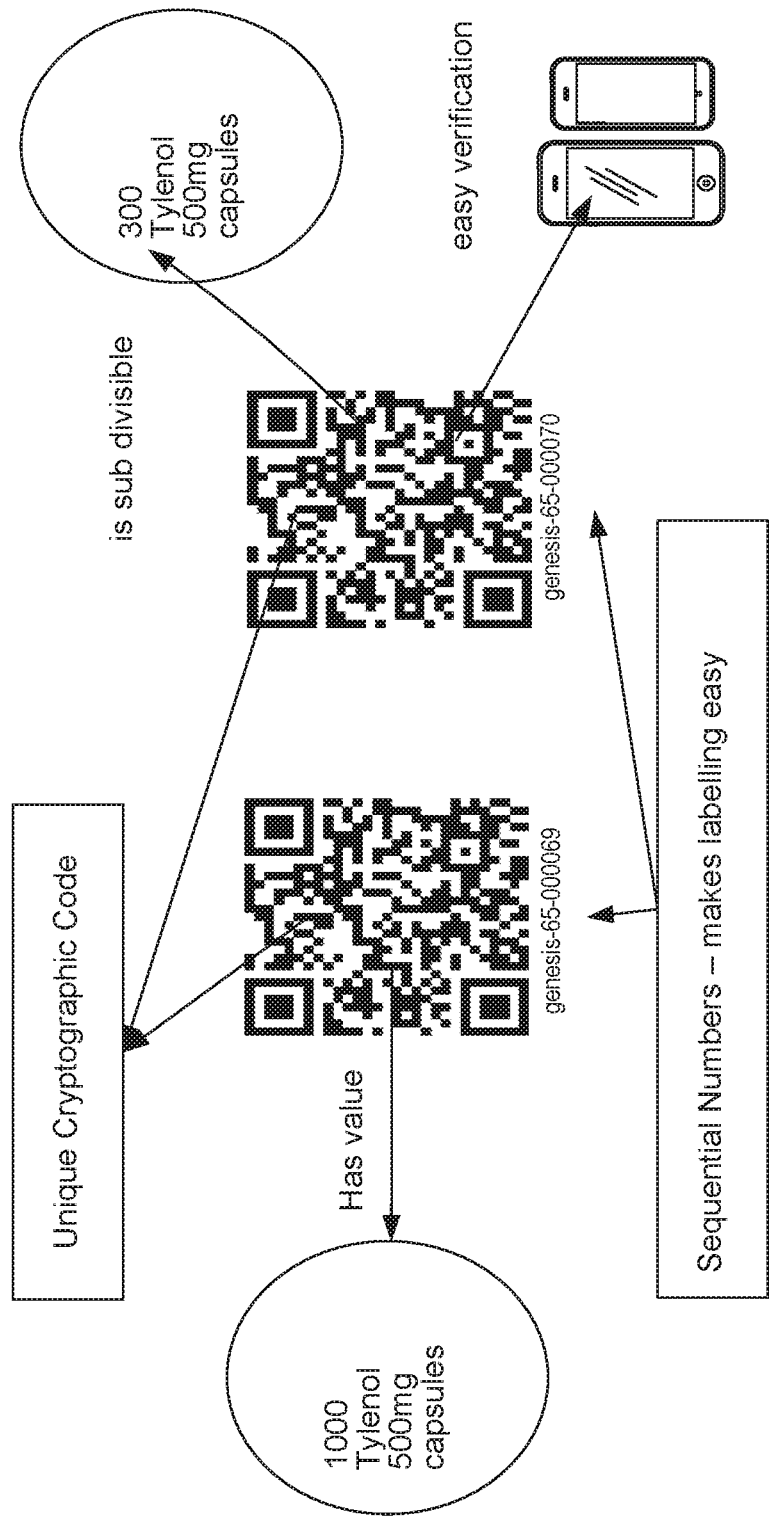
FIG. 6 is a block schematic diagram showing an association of a sequence of addresses to a group of similar items according to the invention.

FIG. 6 is a block schematic diagram showing an association of a sequence of addresses to a group of similar items according to the invention. Embodiments of the invention do this is by pre-generating a roll of labels, each having two fields, i.e. for each item in a collection of items, such as 1000 Tylenol® 500 mg capsules a unique cryptographic code is generated. The invention allows the code to be generated with sequential numbers, e.g. genesis-65-000069, genesis-65-00070. This makes labeling easy and allows the items to be sub-divided, e.g. the 1000 capsules can be divided into a subset comprising 300 Tylenol® 500 mg capsules. Each item or group of items is cryptographically secure and verifiable and, as well, each item or group of items is sequentially identified relative to each other item or group of items within the lot of associated items.

Thus, embodiments of the invention provide:
1. A unique cryptographic address that is deterministically generated; and
2. A sequence number that provides a pointer to the deterministic path on a cryptographic chain when associated with the original master seed and entropy used.

Thus, a pre-generated roll of, for example, a 1,000 labels is associated with a given product shipment. The labels are affixed one to each box in the shipment. In this manner, every box, every shipment, and every SKU is provided with a unique cryptographic address, whilst ensuring that the workflow to affix them is not onerous.

By generating a master seed that comprises a unique address for each lot/batch, manufacturer, distributor, shipper, or originating entity, and associating them with a sequential number, embodiments of the invention take advantage of the properties of elliptic curve mathematics to deterministically generate unique cryptographic key-pairs with a potential maximum of $2^{512}$. This number is so large that it is possible to accommodate every single SKU, item, and shipment for the foreseeable future.

Computer System

Figure 7:
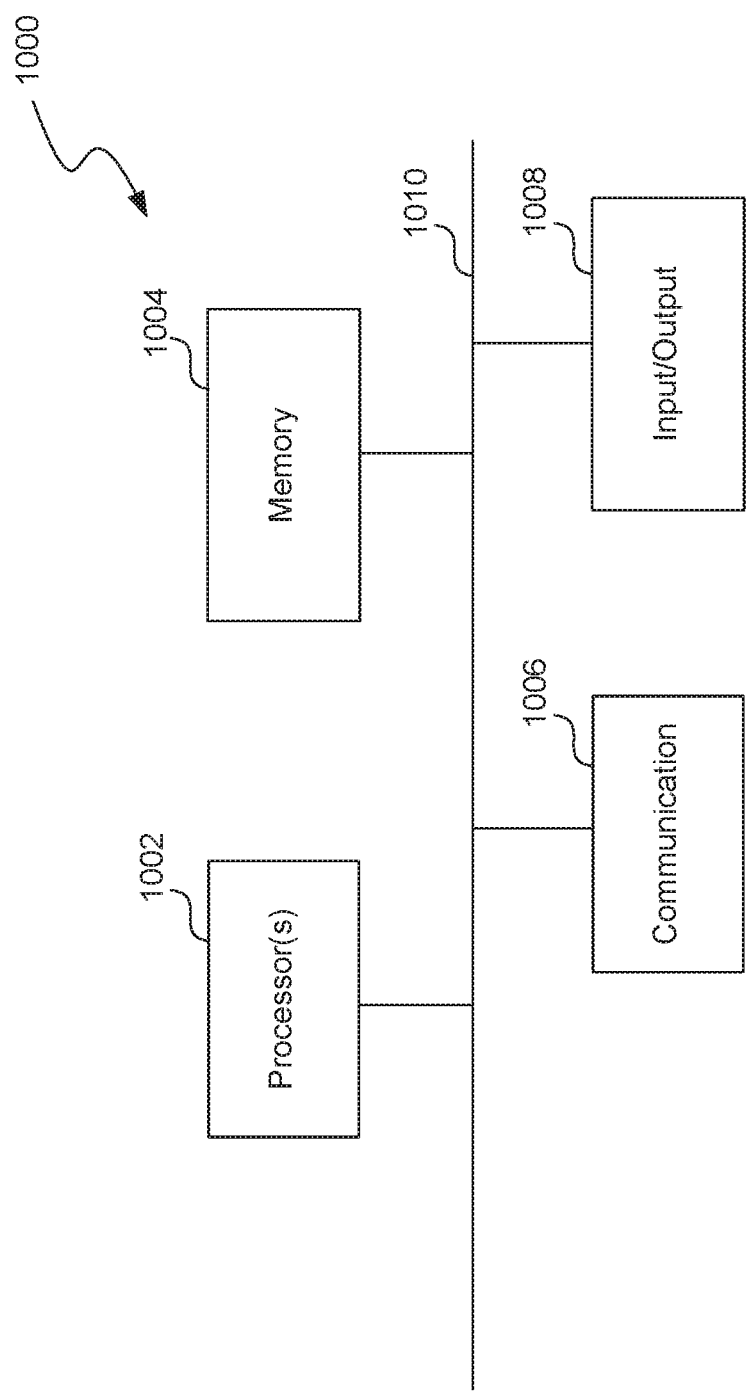
FIG. 7 shows a diagrammatic representation of a machine in the example form of a computer system within which a set of instructions for causing the machine to perform one or more of the methodologies discussed herein may be executed.

FIG. 7 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g. keyboard and pointing devices, touch devices, display devices), storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for deterministically reproducible, cryptographic key-pair representation for all associated items in a lot of items throughout a distribution chain, comprising:
  generating a sequential set of private proof of provenance codes ("popcodes") for said all associated items, each of said private popcodes generated by hashing a concatenation of a trusted party public key, trusted party security data, and a serial number;
  deterministically generating a corresponding sequential set of public popcodes for said all associated items, each of said public popcodes generated by applying an elliptic curve addition with a concatenation of a customer public key and said trusted party security data to said private popcode;
  applying a corresponding one of said public popcodes to each of said all associated items in said lot of items;
  a first computing device requesting a popcode label from a provenance management system or an agent thereof when a first company prepares to deliver a first quantity of goods to its various customers;
  said popcode label encoding a private popcode key used to cryptographically sign a logistic transaction record;

said provenance management system storing a public popcode key corresponding to the private popcode key in a trusted storage;

said provenance management system establishing proof-of-possession by verifying a signature made by the private popcode key;

said first computing device requesting a batch of popcode labels to label said first quantity of goods; and said first computing device reporting a logistic transaction record that assigns a second quantity of goods to a popcode address onto a public ledger database;

wherein said second quantity of goods overlaps at least partially with the first quantity of goods.

2. The method of claim 1, further comprising:
provenance management system storing the popcode key pair in said trusted storage.

3. The method of claim 1, wherein said popcode label comprises a barcode.

4. The method of claim 1, further comprising:
representing a public ledger database as a block chain;
using said block chain to keep track of multiple logistic transactions;
a consumer or company using a popcode label to access said block chain to verify provenance associated with a set of items.

5. The method of claim 4, wherein any popcode label consistent with said provenance management system can be scanned to check against the public ledger database represented by said block chain.

6. The method of claim 1, further comprising:
deriving popcodes from a sequence of identifiers, where physical popcodes that encode cryptographic information are manufactured by a provider, the provider generating private cryptographic information to facilitate bulk operations against a range within the sequence of identifiers.

* * * * *